2 Sheets--Sheet 1.
HENRY H. PARISH.
Improvement in Treating Sewage for Fertilizers, Etc.
No. 125,074.      Patented March 26, 1872.
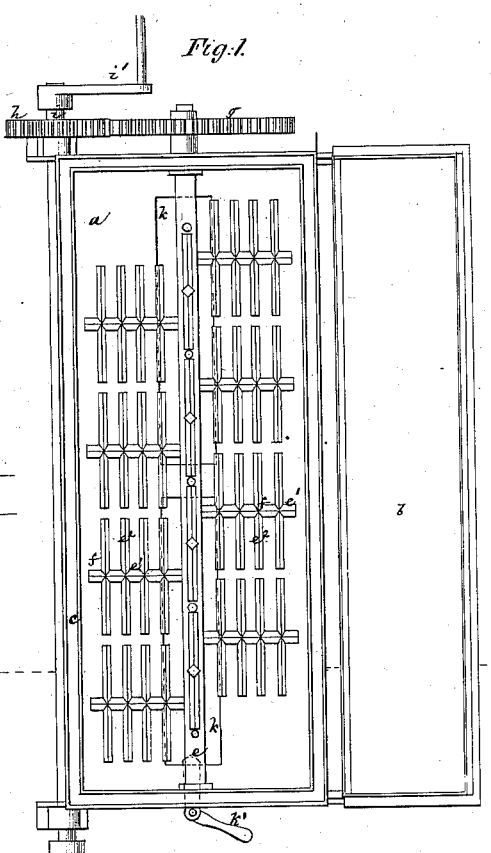
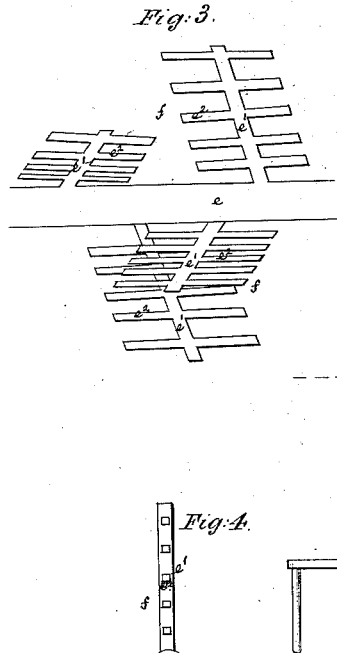
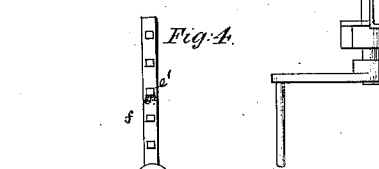
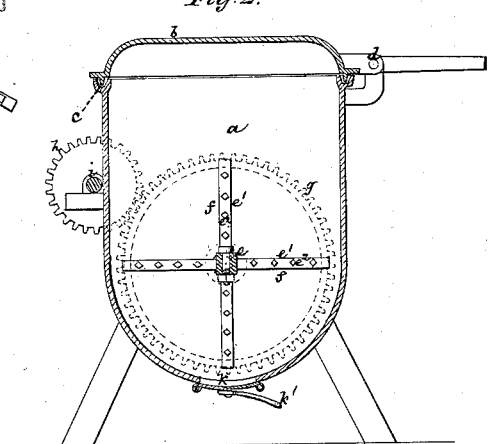
Witnesses:

HENRY H. PARISH.  
Improvement in Treating Sewage for Fertilizers, Etc.  
No. 125,074. 2 Sheets--Sheet 2. Patented March 26, 1872.
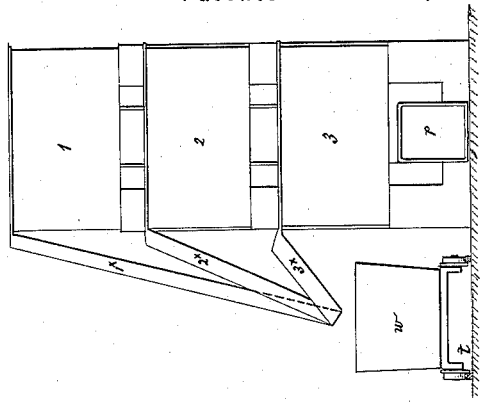
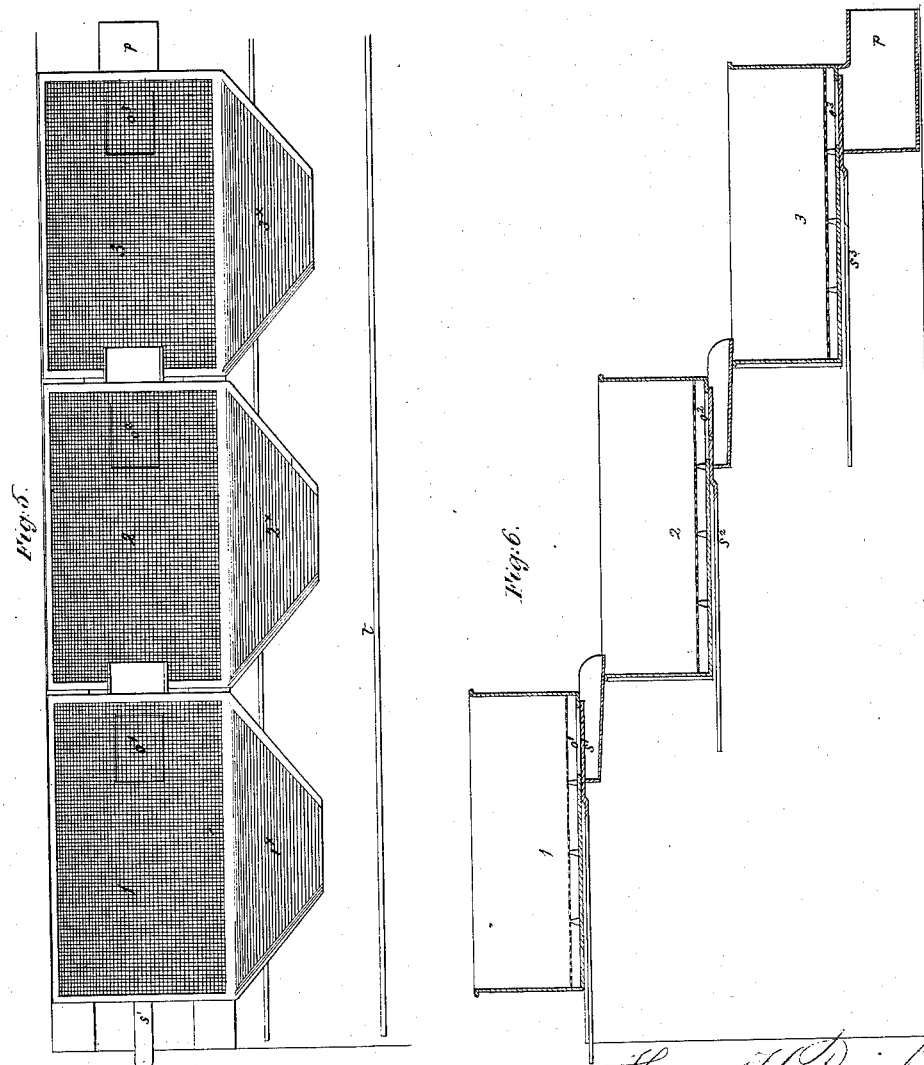

UNITED STATES PATENT OFFICE.

HENRY HEADLEY PARISH, OF ROME, ITALY.

IMPROVEMENT IN TREATING SEWAGE FOR FERTILIZERS, &c.

Specification forming part of Letters Patent No. 125,074, dated March 26, 1872.

*To all to whom these presents shall come:*

I, HENRY HEADLEY PARISH, at present residing at Rome, in the Kingdom of Italy, a subject of the Queen of Great Britain, have invented or discovered new and useful "Improvements in the Treatment of Sewage or other Fecal Matter and Various Substances for Conversion into Manure;" and I, the said HENRY HEADLEY PARISH, do hereby declare the nature of the said invention, and in what manner the same is to be performed, to be particularly described, and ascertained in and by the following statement thereof—that is to say:

The invention relates to chemical means and appliances for deodorizing, disinfecting, and converting into manure, sewage, and other fecal matters, whether human, animal, vegetable, solid, or liquid; also the blood of animals and other refuse matters derived from various sources. According to this invention the liquid or the semi-liquid sewage to be treated is conveyed by hermetically-sealed or air-tight pipes, hose, carts, boats, or sewers into suitable buildings or works, arranged with apparatus, filters, and machinery—which may be worked by hand, steam, or other motive power—for treating and converting the sewage or other refuse matters into manure in accordance with this invention. Should the sewage be too liquid the excess of such liquid is directed into a series of suitable filters, by preference arranged according to these improvements, one above the other, with slides between them, as hereinafter described. The bulk of the sewage is conveyed into machines for mixing and combining it with other materials, as is hereinafter described; and the sewage is then covered with the purifying composition, hereinafter described; whereupon the rotary apparatus within the machine is caused to revolve, so as to thoroughly mix, deodorize, and, at the same time convert the amalgamating mass into a pulverizable manure superior to any manure hitherto known, and cheaper.

The materials employed for the deodorization and conversion of the sewage and other matters into manure according to this invention, are—First, wood charcoal, known and sold under the name of "retorted charcoal," being the produce of pyroligneous-acid works. The second material employed is slaked lime; and the above two substances, mixed together, by weight, of one part retorted charcoal to two parts of slaked lime, make—with the water rendering them semi-liquid—a composition, by weight, equal (or thereabouts) to three parts applicable to five parts sewage, thus forming an amalgamation for producing superior manure in accordance with these improvements.

The mixing-machine, before referred to, consists of a vessel of iron, or other suitable metal or material, for receiving the sewage. This vessel is furnished with a cover fitting into a water-joint, to prevent the escape of odors or noxious vapors. The vessel is provided with a revolving axis, furnished with arms or rakes, which, in their revolution, stir up and combine the sewage and other materials contained in the vessel. The revolving axis passes through stuffing-boxes in the ends of the vessel, which is arranged with valves for discharging the contents of the vessel when required; and, in order that the said invention may be most fully understood, I will proceed to describe the drawing hereunto annexed.

Description of the Drawing.

Figure 1 represents a plan, with the cover raised, of an apparatus for mixing and amalgamating the fecal and other matters with the purifying materials, in accordance with this invention; Fig. 2 a vertical transverse section of the same; and Figs. 3 and 4, views showing modified construction of the rake or stirrer in said apparatus. Fig. 5 is a plan; Fig. 6, a longitudinal vertical section; and Fig. 7 an end view of a filtering apparatus employed in the treatment of liquid manures. Referring, in the first instance, to Figs. 1, 2, 3, and 4 of the drawing—

*a* is a vessel (by preference made of sheet metal) furnished with a hinged cover, the edges of which, when the vessel is closed, enter into a channel, *c*, formed around the upper part of the vessel filled with water, thus forming a water-joint, to prevent the escape of odors or noxious vapors from the vessel *a* and during the mixing process. *d* is a hinge or joint, upon which the cover *b* moves when raised. *e* is a central shaft or axis, revolving in suitable bearings at each end of the vessel $a$. Upon this axis a series of radial arms, $e^1$, are fixed, furnished with blades $e^2$, thus forming them into a series of revolving rakes, $f$, which revolve within the lower semicircular part of the vessel $a$. The number of the arms $e^1$ and rakes $e^2$ may be varied, as seen by Figs. 2, 3, and 4. $g$ is a toothed wheel fixed on one end of the axis $e$, to which rotary motion is communicated by means of the toothed pinion $h$, fixed on the axis $i$, which is actuated by the crank-handles $i'$ $i'$ by manual labor or a pulley may be fixed on the axis $i$, motion being communicated thereto by means of a steam-engine or other motive-power. $k$ $k$ are slide-valves, for discharging the contents of the vessel $a$, the slides being withdrawn by the lever-handles $k'$, so as to uncover the discharging-orifices at the bottom of the vessel $a$.

The manner in which it is preferred to mix the several proportions of the deodorizing materials for a given quantity of manure is as follows: Assuming that the quantity to be dealt with is forty-eight pounds, it is divided into eight parts or other numerical equivalent. Take six pounds of powdered retorted charcoal and twelve pounds of slaked lime, leaving thirty pounds of sewage. The slaked lime must be mixed with water until it assumes the consistency of cream. The powdered charcoal must be added to it and the whole mixed with water until it becomes semi-liquid or thereabout. When these materials are well mixed, weigh eighteen pounds (to form three parts out of eight) from the mixture, which is the quantity, or thereabout, which is required to purify thirty pounds or thereabout (to form five parts out of eight) of sewage. The success of the process greatly depends upon using the proper proportions of retorted charcoal and of the slaked lime, and if the latter is not perfectly mixed before the charcoal is added it will be difficult to make it soft enough to combine, as the charcoal would harden the lime and the whole would remain rough and clotted and badly mixed. When the proper quantity of sewage, together with the deodorizing mixture, has been introduced into the vessel $a$, the rotary apparatus is set in motion, by which means the deodorizing mixture will in a short time become thoroughly incorporated with the sewage and thus convert it into valuable manure. The slides or valves at the bottom of the vessel $a$ are then withdrawn to open the valves through which the contents of the mixing machine are discharged into suitable receptacles underneath. The manure thus prepared is allowed to dry, and may be easily pulverized, ready for being applied for manuring and fertilizing land.

According to another part of this invention, if the sewage to be treated is more than semi-liquid or altogether liquid, such as urine, another process is employed by which the fertilizing properties of the liquid manure are extracted therefrom and combined with charcoal, slaked lime and common earth, so as to produce valuable manures. For this purpose, in carrying out this part of the invention, the liquid manure is conducted into a series of filters or vessels containing the absorbent deodorizing and purifying materials. A convenient arrangement of the filtering vessels employed in accordance with this part of the improvements is shown in Figs. 5, 6, and 7, the same representing a series of filtering-vessels, arranged one above another, in order that the liquid sewage may flow from one to another, as required. Openings covered with wire-gauze or other perforated material are formed at the bottom of each vessel, such openings being closed by a slide, so that the fluid sewage can be retained for any suitable length of time in each of the filtering-vessels and then be discharged into the one below by withdrawing the slide. The uppermost filtering vessel, 1, of the series is filled with unpowdered retorted charcoal in lumps or grains. The filtering-vessel 2 is filled with slaked lime and the filtering-vessel 3 is filled with common earth. The liquid sewage is first conducted by a spout into the filtering-vessel 1 containing charcoal, where it is allowed to remain for about half an hour. The slide $s'$ is then withdrawn to allow the liquid to flow from the filtering-vessel 1 through the discharging-orifice $O^1$ into the filtering-vessel 2 containing slaked lime, where it is allowed to remain for about half an hour, when the slide $s^2$ is withdrawn to allow the liquid to filter through the orifice $O^2$ into the vessel 3 below, filled with common earth, where it remains for about half an hour, and when the slide $s^3$ is withdrawn the liquid flows away as clear water into the conduit or passage $p$, the fertilizing properties of the sewage being deposited in the filtering materials contained in the series of vessels, which materials, when thoroughly impregnated, constitute three distinct qualities of manure, which are passed separately from the series of vessels 1 2 3 down into the several chutes $1^\times$ $2^\times$ $3^\times$, as shown, into trucks or wagons $w$, upon a tramway, $t$, or into a cart, boat, or other receptacle, as may be found most convenient. The contents of each vessel thus converted into manure are kept separate, so as to be applied separately or combined to the purpose for which they are best suited.

What is here claimed, and desired to be secured by Letters Patent, is—

1. The deodorizing compound, consisting of charcoal and slaked lime, in or about the proportions specified, for deodorizing and converting a given quantity of sewage or other refuse matter into manure, substantially as described.

2. The combination of the vessel $a$ having a sealed cover, $b$, and valve or valves in its bottom, with the rakes $f$ of the revolving shaft $e$, substantially as and for the purpose herein set forth.

3. The process herein described of converting liquid sewage into manure of different qualities by filtering the same through a series of vessels containing charcoal, slaked lime, and common earth, substantially as described with reference to Figs. 5, 6, and 7 of the drawing, and whereby the valuable properties of the sewage are deposited in said materials for fertilizing purposes, essentially as specified.

HENRY HEADLEY PARISH.

Witnesses:
GUSTAVO PAGNINI, &c.,
ZAUNI FIDELE, &c.